US012781799B2

(12) United States Patent
Zhang et al.

(10) Patent No.: US 12,781,799 B2
(45) Date of Patent: Nov. 3, 2026

(54) HYBRID CAGE AND ITS APPLICATIONS

(71) Applicant: AKTIEBOLAGET SKF, Gothenburg (SE)

(72) Inventors: Bin Zhang, Beijing (CN); Jinguang Zhu, Dalian (CN); Longnian Du, Dalian (CN); Zhengjiang Wu, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/942,957

(22) Filed: Nov. 11, 2024

(65) Prior Publication Data

US 2025/0163963 A1 May 22, 2025

(30) Foreign Application Priority Data

Nov. 20, 2023 (CN) ......................... 202311541764.7

(51) Int. Cl.
*F16C 33/46* (2006.01)
*F16C 33/48* (2006.01)
*F16C 33/49* (2006.01)

(52) U.S. Cl.
CPC ...... *F16C 33/4611* (2013.01); *F16C 33/4664* (2013.01); *F16C 33/48* (2013.01); *F16C 33/49* (2013.01); *F16C 2226/62* (2013.01)

(58) Field of Classification Search
CPC .. F16C 33/3831; F16C 33/3881; F16C 33/40; F16C 33/41; F16C 33/4611; F16C 33/4664; F16C 33/48; F16C 33/49; F16C 2226/60; F16C 2226/62; F16C 2300/14
See application file for complete search history.

(56) References Cited

FOREIGN PATENT DOCUMENTS

| | | | | |
|---|---|---|---|---|
| DE | 20020397 U1 | * | 2/2001 | .......... F16C 33/4676 |
| DE | 102017115355 A1 | * | 1/2019 | .............. F16C 33/38 |
| DE | 102018106584 A1 | * | 9/2019 | .......... F16C 33/4676 |
| JP | 2007303607 A | * | 11/2007 | .......... F16C 33/4611 |
| KR | 20210146125 A | * | 12/2021 | .......... F16C 33/4605 |

OTHER PUBLICATIONS

Machine Translation of DE-20020397-U1 (Year: 2001).*
Machine Translation of JP-2007303607-A (Year: 2007).*
Machine Translation of DE-102017115355-A1 (Year: 2019).*
Machine Translation of DE-102018106584-A1 (Year: 2019).*
Machine Translation of KR-20210146125-A (Year: 2021).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A hybrid cage includes a unitary annular main frame and a plurality of attachment members fixedly attached to the main frame to define cage pockets for receiving rolling elements. The main frame may be formed from a first material and the plurality of attachment members may be formed from a second material different than the first material.

12 Claims, 2 Drawing Sheets

HYBRID CAGE AND ITS APPLICATIONS

CROSS-REFERENCE

This application claims priority to Chinese patent application no. 202311541764.7 filed on Nov. 20, 2024, the contents of which are fully incorporated herein by reference.

TECHNOLOGICAL FIELD

The present disclosure is directed to a hybrid cage and to a large rolling bearing utilizing such cage.

BACKGROUND

Large rolling bearings generally use cages made from copper, steel or iron. Copper cages have a low coefficient of friction and good wear resistance between the cages and the rolling elements, resulting in high limiting speeds and low vibration and noise. However, due to the limitation of material strength, copper cages are less capable of withstanding higher loads (especially shock loads). Compared to copper cages, steel (or iron) cages have higher material strength and can therefore withstand higher loads. However, steel (or iron) cages have poor wear resistance and are prone to generate iron filings when rubbing against the rolling elements, posing a potential threat to the safe operation of the bearings. In addition, although steel (or iron) cages have a low material cost, they have a high machining cost due to their hardness. Taken together, their manufacturing costs are about the same as those of copper cages and do not have a significant cost advantage.

SUMMARY

In order to solve the above-mentioned technical problems, the present disclosure provides a hybrid cage comprising a main frame integrally formed in a circumferential direction and attachment members configured to be fixedly assembled to the main frame, wherein the attachment members are used to form, independently of or in conjunction with the main frame, cage pockets for restraining rolling elements of a bearing.

The hybrid cage allows different members to be formed from different materials to contribute different properties. For example, the main frame can be configured to have high strength while the attachment members be configured to have better friction properties, and/or the main frame can be configured to have a low weight while the attachment members may have better machinability. Thus, the diversified properties of the cage components (materials) are able to meet the application requirements of rolling bearings in terms of performance, cost, ease of machinability and many other aspects. In addition, the hybrid cage is also conducive to reducing the relatively complex structure of the integrated cage into a relatively simple structure of the cage components, so as to simplify the production process and reduce manufacturing costs.

In addition, the present disclosure further provides a large rolling bearing with an outer diameter of 400 millimeters or more, equipped with the hybrid cage as described above.

The application of hybrid cages is particularly favored by the fact that large bearings have a large internal space, which naturally eliminates the constraints of tight spaces on complex connections.

BRIEF DESCRIPTION OF THE DRAWINGS

Various specific embodiments and beneficial technical effects of the disclosure are described in detail below with reference to the accompanying drawings in which.

DETAILED DESCRIPTION

In the following description, terms indicating directions, such as “axial”, “radial” and “circumferential” direction, unless otherwise specified or delimited, refer to the axial, radial and circumferential directions of the component being described.

Figure 1:
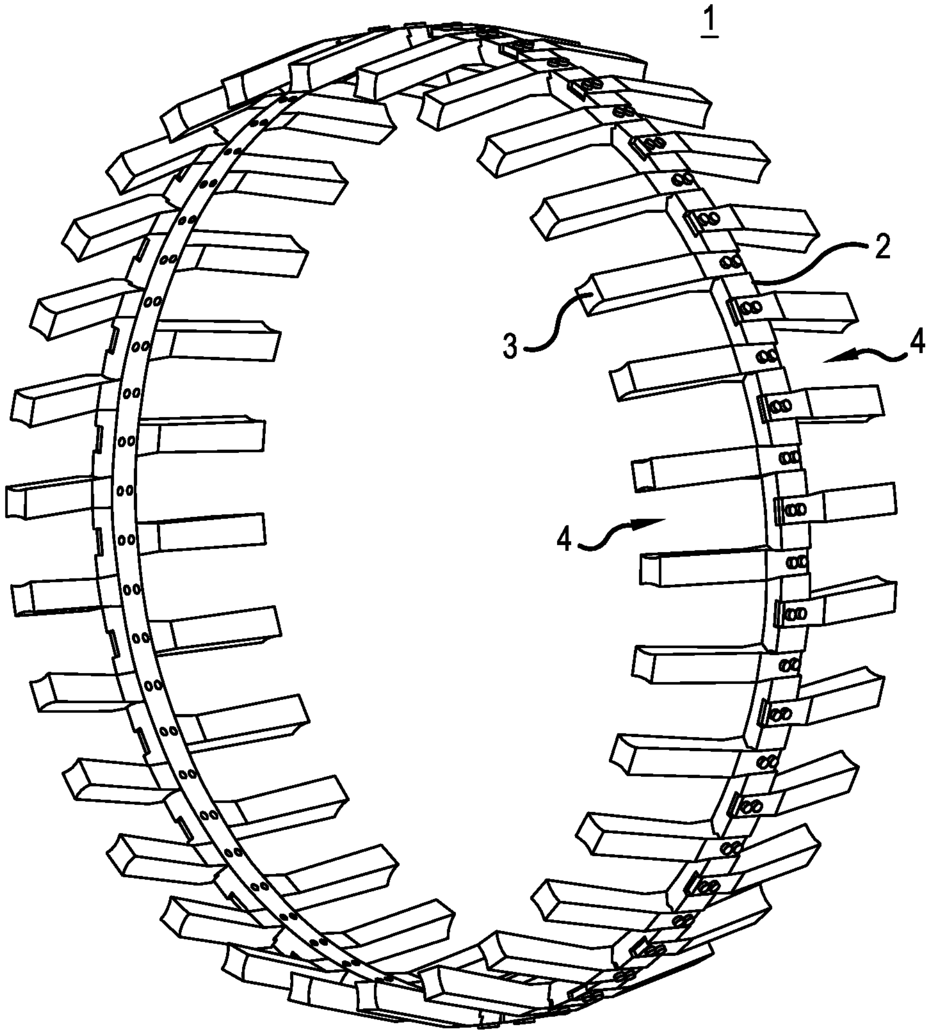
FIG. 1 is a perspective view of the overall structure of a hybrid cage according to an embodiment of the present disclosure.
Figure 2:
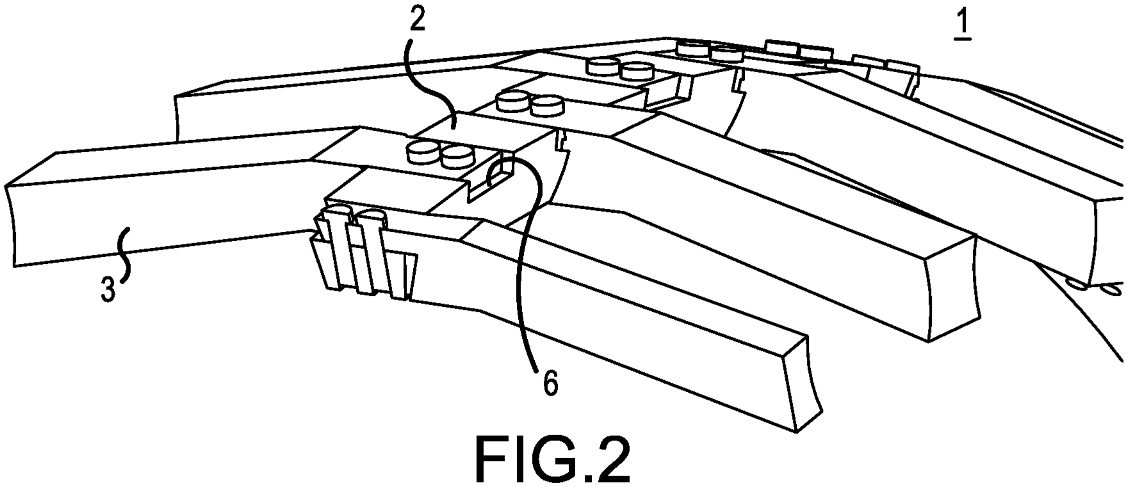
FIG. 2 is a detail view of a portion of the hybrid cage of FIG. 1.

FIGS. 1 and 2 show the overall and partial structural perspective views of the hybrid cage, respectively. As can be seen from the drawings, the hybrid cage 1 comprises an integrally formed annular main frame 2 and attachment members 3 that are fixedly attached to the main frame 2. The attachment members 3 are formed separately from the main frame 2 and are attached to the main frame 2 such that a joint exists between each attachment member 3 and the main frame 2. In the specific embodiment illustrated, there are a large number of attachment members 3 that form, independently of or in conjunction with the main frame 1, pockets 4 for guiding rolling elements 5. The pockets 4 are recessed spaces in the cage 1 for holding and restraining rolling elements 5, as shown in FIG. 4, so that the rolling elements 5 can be spaced at predetermined intervals from each other in the circumferential direction.

In the specific embodiment shown in FIGS. 1 and 2, the main frame 2 comprises an annular backbone that includes connecting structures 6 such as slots, holes, cavities, or the like, for receiving fasteners such as nails, bolts, pivots, or the like, to fasten the attachment members 3 thereto. It is not difficult to understand that the connections between the main frame 2 and the attachment members 3 are not limited to the above-mentioned connection methods. More general connections, including, but not limited to, bonding, welding, snap fit and the like, all can be used to realize the hybrid cage described in the present disclosure, as long as they can reliably fix and connect the attachment members to the main frame in a predetermined manner.

Figure 3:
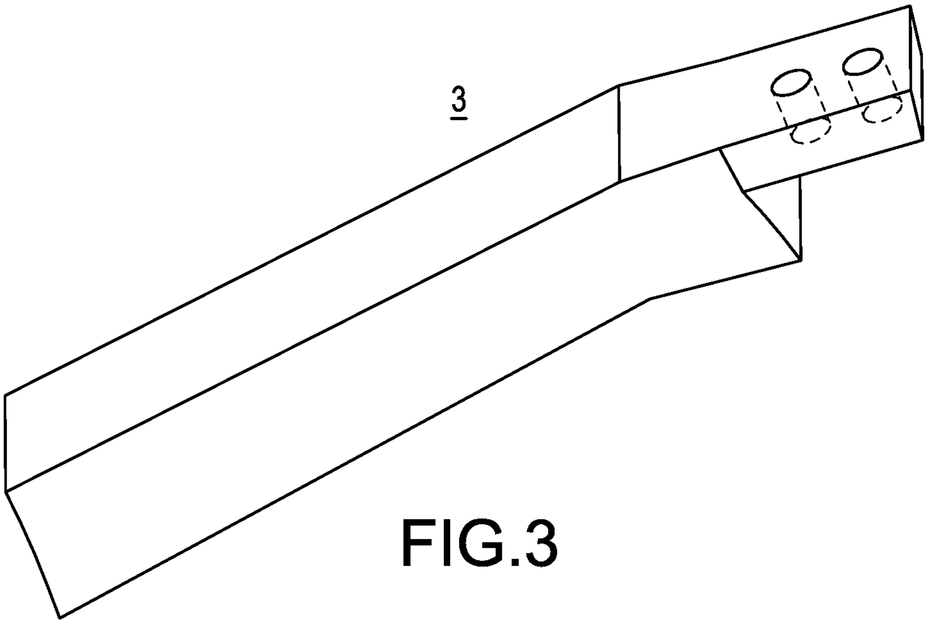
FIG. 3 is a perspective structural view of one of the cage beams (an attachment member) of the hybrid cage of FIG. 1.

FIG. 3 shows the structural perspective view of an attachment member 3. As can be seen in conjunction with FIGS. 1 and 2, the attachment member 3 comprises a substantially bar shaped cage beam which may have a substantially uniform shape. These cage beams, after being assembled to the backbone 2, form pockets 4 therebetween for retaining the rolling elements 5. The cage beams 3 may be formed to have different profiles in order to match the shape of the pockets 4 to the rolling elements 5. The cage beams 3 have first portions 7 configured to guide rolling elements and second portions 8 configured to mate with the main frame 2. Pins 9 connect the first portions 7 to the main frame 2.

Figure 4:
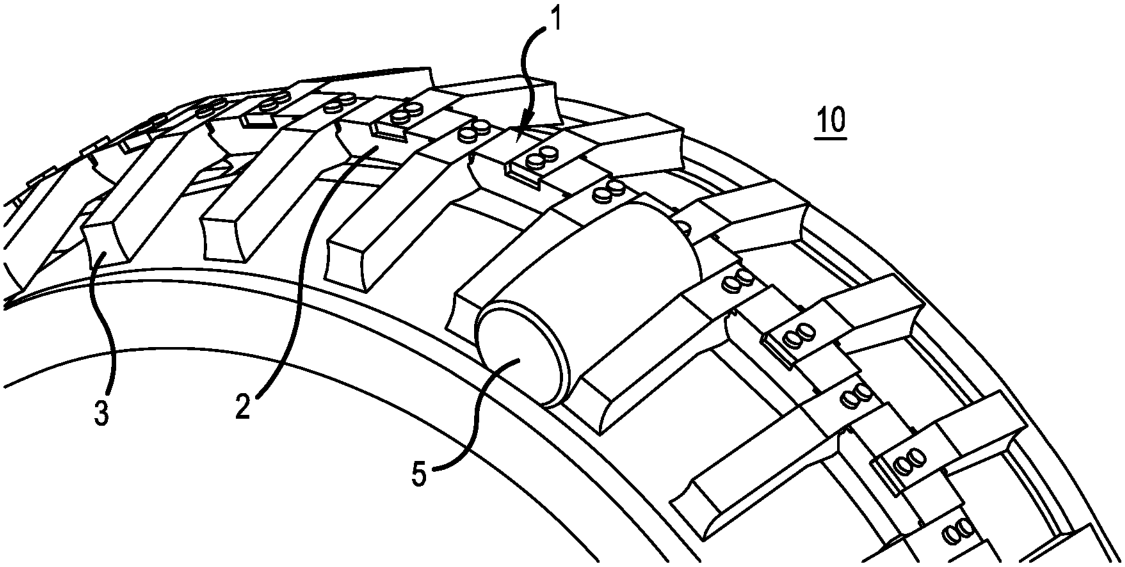
FIG. 4 is a partial structural perspective view of a spherical roller bearing assembled with the hybrid cage of FIG. 1.

FIG. 4 shows the partial structural perspective view of a spherical roller bearing assembled with the hybrid cage. As can be seen, adjacent cage beams 3 are formed in the circumferential direction with concave spherical surfaces facing each other in a shape matching and complementing the spherical surfaces of the rolling elements. Similarly, the cage beams 3 can also be fitted with the backbone 2 to form pockets 4 of other shapes for accommodating bearing rolling elements such as cylindrical rollers, tapered rollers or spherical rollers (i.e. balls).

An important feature of the present disclosure is also that different materials can be used for the different components of the cage 1. For example, the main frame 2 may be made of a first material while the attachment members 3 are made of a second material that is different from the first material. As different materials have different properties, this confers a multitude of properties and/or advantages on the cage. For example, the first material may have strength properties superior to the second material, while the second material may have friction properties superior to the first material. The resulting cage has a low coefficient of friction with the rolling elements while having a high structural strength of the main body, thereby combining multiple properties and/or advantages that are not possible with a cage made of a single material.

It is important to note that the material properties are not limited to mechanical properties such as strength and wear resistance, but also include other properties such as weight, cost and ease of machining that are of significant value in production and application. As a specific embodiment, the first material may be steel, iron or aluminum alloy, and the second material may be copper, copper alloy, aluminum or polymer wear-resistant material. Among them, steel and iron have higher strength and lower material costs, while copper and copper alloys have better wear resistance and ease of machining. As a preferred embodiment, the main frame 2 may be made of steel or iron, while the attachment members 3 made of copper or copper alloy. The combination of the above materials provides the cage with high body strength, good friction and wear resistance, and relatively low manufacturing costs at the machining level, thus combining performance advantages at the technical level and cost advantages at the economic level.

Not surprisingly, hybrids are conditional on connections, and connections sometimes come at the cost of space. Large bearings have a large internal space, which naturally removes the constraints of a small space on complex connections (structures) and is therefore particularly favorable to the application of the hybrid cage. The hybrid cage is therefore particularly suitable for large rolling bearings, especially those with an outside diameter of 400 mm or more.

The hybrid cage described above and the rolling bearings employing it are not limited by the specific embodiments and more general technical solutions will be subject to the limitations of the accompanying claims. Any modifications and improvements to the present invention are within the scope of protection of the present invention, provided they conform to the limitations of the accompanying claims.

What is claimed is:

1. A bearing cage comprising:

a unitary annular main frame having a radially outer surface and a first lateral surface and a second lateral surface, the main frame being formed from a first material, and a plurality of attachment members fixedly attached to the main frame to define cage pockets for receiving rolling elements, the attachment members being formed from a second material different than the first material, wherein the radially outer surface includes a plurality of axially extending slots each having a radially outwardly facing slot bottom, a first subset of the axially extending slots having an axially facing end opening in the first lateral surface and a second subset of the axially extending slots having an axially facing end opening in the second lateral surface, wherein each of the attachment members comprises a cage beam having a first portion having a first radial thickness, the first portions being configured to guide a rolling element, and a second portion at a longitudinal end of the cage beam having a second radial thickness less than the first radial thickness and being mounted in a respective one of the plurality of axially extending slots with a radially inwardly facing surface of the second portion overlying and contacting the radially outwardly facing slot bottom, and wherein the first portions of a first subset of the cage beams extend from the first lateral surface of the main frame in a first direction and the first portions of a second subset of the cage beams extend away from the second lateral surface of the main frame in a second direction opposite the first direction.

2. The bearing cage according to claim 1, wherein the cage beams are fixedly connected to the connecting structures by fasteners.

3. The bearing cage according to claim 2, wherein each of the fasteners extends axially through the second portion of a respective one of the cage beams and into an opening in the main frame.

4. The bearing cage according to claim 3, wherein the cage pockets are configured to guide cylindrical rollers or tapered rollers or spherical rollers.

5. The bearing cage according to claim 1, wherein the second material has a lower coefficient of friction than the first material.

6. The bearing cage according to claim 2, wherein the first material comprises iron, steel or an aluminum alloy, and the second material comprises copper, a copper alloy, aluminum or a polymer material.

7. The bearing cage according to claim 1, wherein the first material comprises iron and the second material comprises copper.

8. A rolling bearing comprising:

an inner ring, an outer ring, a bearing cage according to claim 1, and a rolling element mounted in each of the cage pockets, wherein an outer diameter of the outer ring is at least 400 mm.

9. The bearing cage according to claim 1, wherein the cage beams of the first subset of the cage beams and the cage beams of the second subset of the cage beams alternate in a circumferential direction.

10. The bearing cage according to claim 9, wherein the radially outer surface of the main frame has an axial width greater than an axial width of a radially inner surface of the main frame such that the first lateral surface extends at an oblique angle relative to the radially outer surface of the main frame, and wherein an axially inner end of the first portion of each cage beam is in face contact with the first lateral surface.

11. The bearing cage according to claim 9, wherein the plurality of axially extending slots extend from the first lateral surface to the second lateral surface.

12. The bearing cage according to claim 1, wherein an axially inner end of the first portion of each cage beam of the first subset of the cage beams is in face contact with the first lateral surface.

* * * * *